United States Patent [19]

Kondo et al.

[11] Patent Number: 4,668,990

[45] Date of Patent: May 26, 1987

[54] SOLID STATE IMAGING APPARATUS AND SOLID STATE PHOTOSENSOR ARRANGEMENT

[75] Inventors: Ryuji Kondo; Jin Murayama; Makoto Shizukuishi; Hiroshi Tamayama; Takashi Yano, all of Kaisei, Japan

[73] Assignee: Fuji Photo Film Co., Ltd., Kanagawa, Japan

[21] Appl. No.: 775,306

[22] Filed: Sep. 12, 1985

[30] Foreign Application Priority Data

Sep. 14, 1984 [JP] Japan .................................. 59-191477

[51] Int. Cl.$^4$ .............................................. H04N 3/14
[52] U.S. Cl. ........................... 358/213.23; 358/213.29
[58] Field of Search ................... 358/212, 213, 163; 357/24 LR

[56] References Cited

U.S. PATENT DOCUMENTS

| | | | |
|---|---|---|---|
| 4,335,405 | 6/1982 | Sakane et al. | 358/213 |
| 4,407,010 | 9/1983 | Baji et al. | 358/213 |
| 4,481,539 | 11/1984 | Meise et al. | 358/213 |

Primary Examiner—Gene Z. Rubinson
Assistant Examiner—Stephen Brinich
Attorney, Agent, or Firm—Birch, Stewart, Kolasch & Birch

[57] ABSTRACT

An imaging apparatus includes a solid state imaging device in which pixels are arranged in a matrix. Row transfer lines and column transfer lines are each sequentially scanned so that video signals are delivered time-serially from the respective pixels to an output terminal. The row transfer lines are selected by a CTD which is scanned by drive pulses to sequentially and cyclically transfer charges therethrough. Gates associated with the CTD select one of the row transfer lines at a time responsive to a potential which is developed by the charges. The column transfer lines are selected by a shift register which addresses selection gates associated with the respective columns one after another responsive to a clock. The CTD may be assigned to the column transfer lines and the shift register to the row transfer lines. The apparatus is applicable even to a solid state photosensor arrangement made up of an array of photosensor elements in which case only one of the row transfer lines will be used.

11 Claims, 49 Drawing Figures

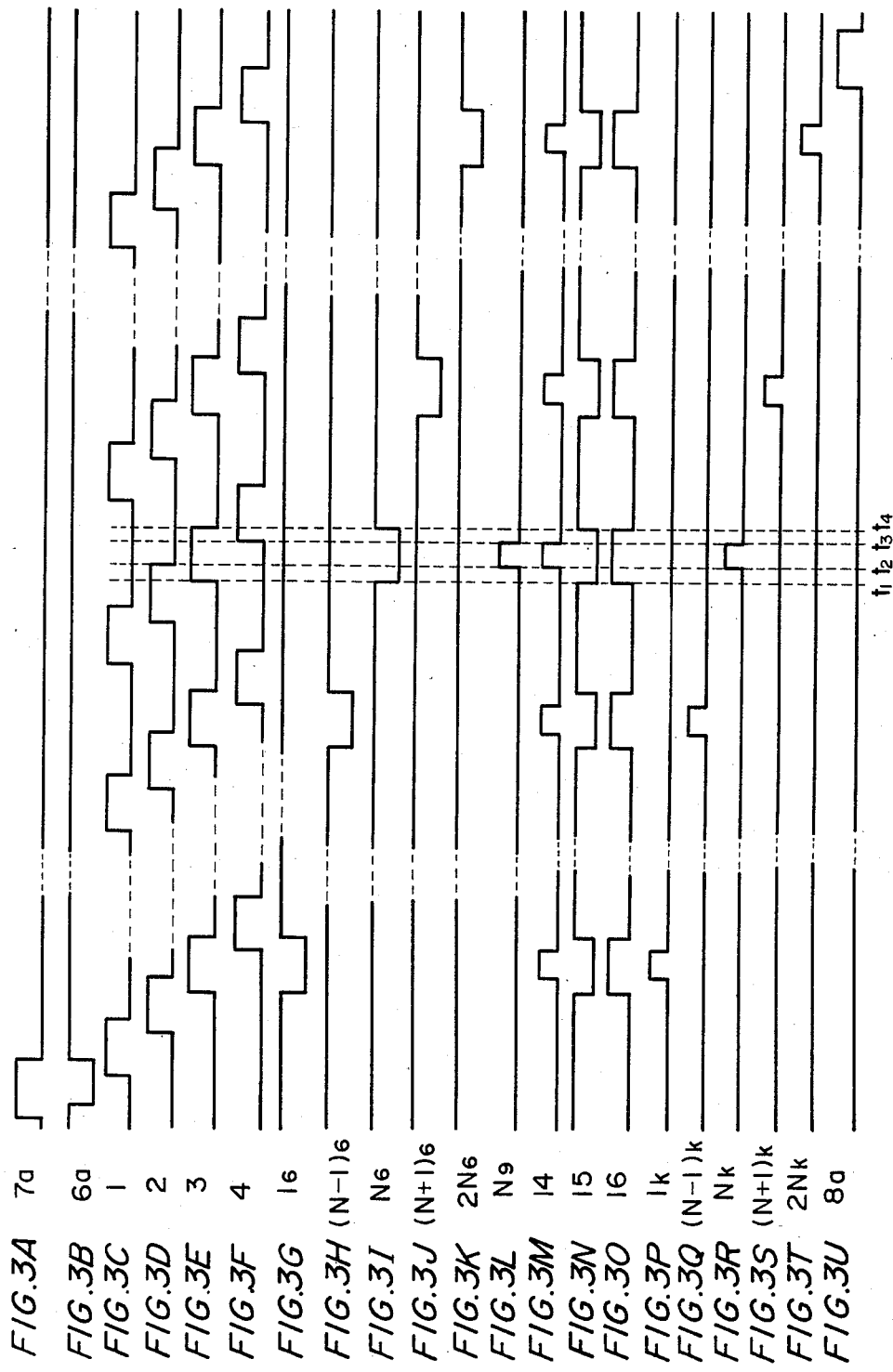

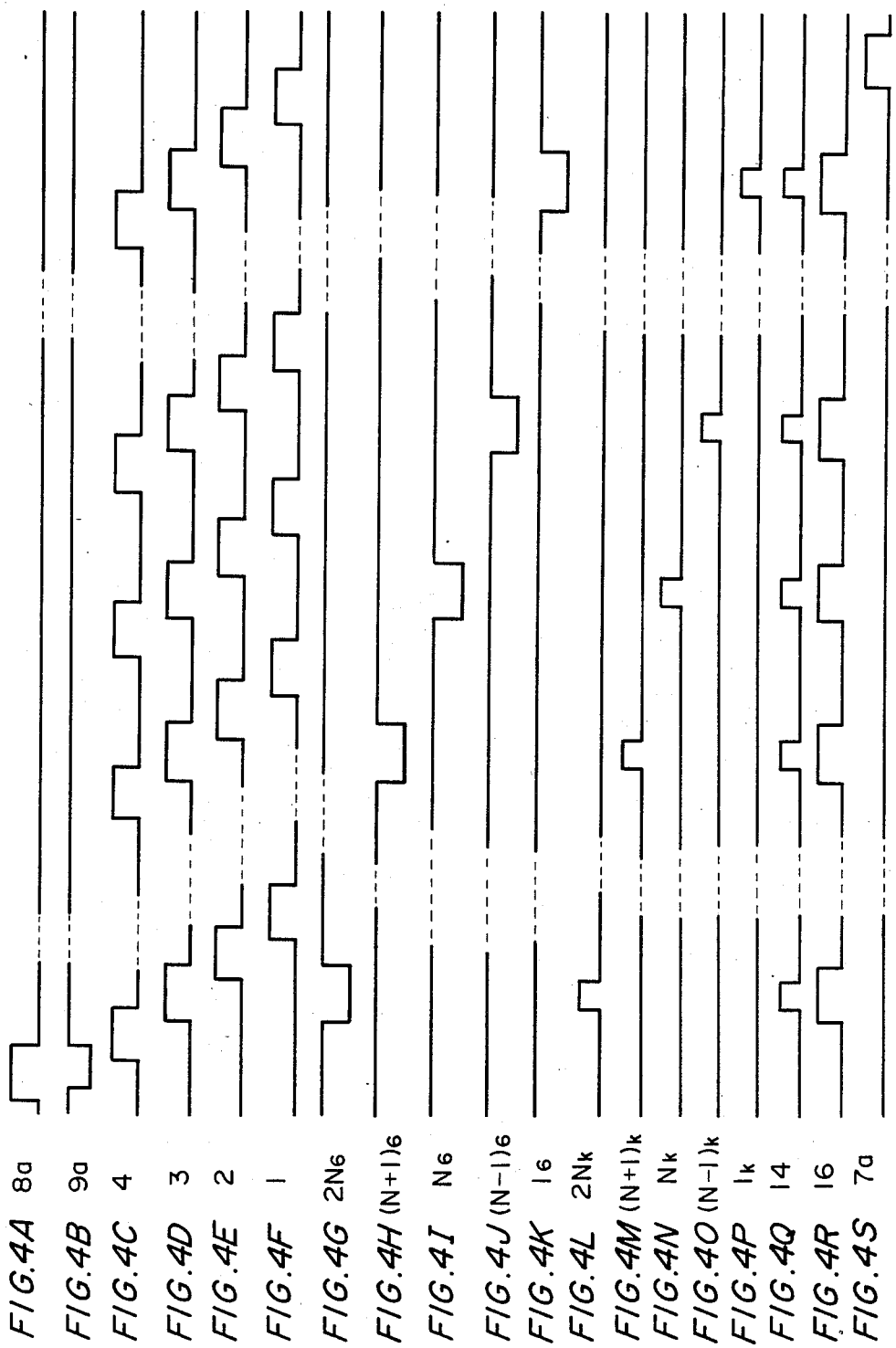

F I G . 6
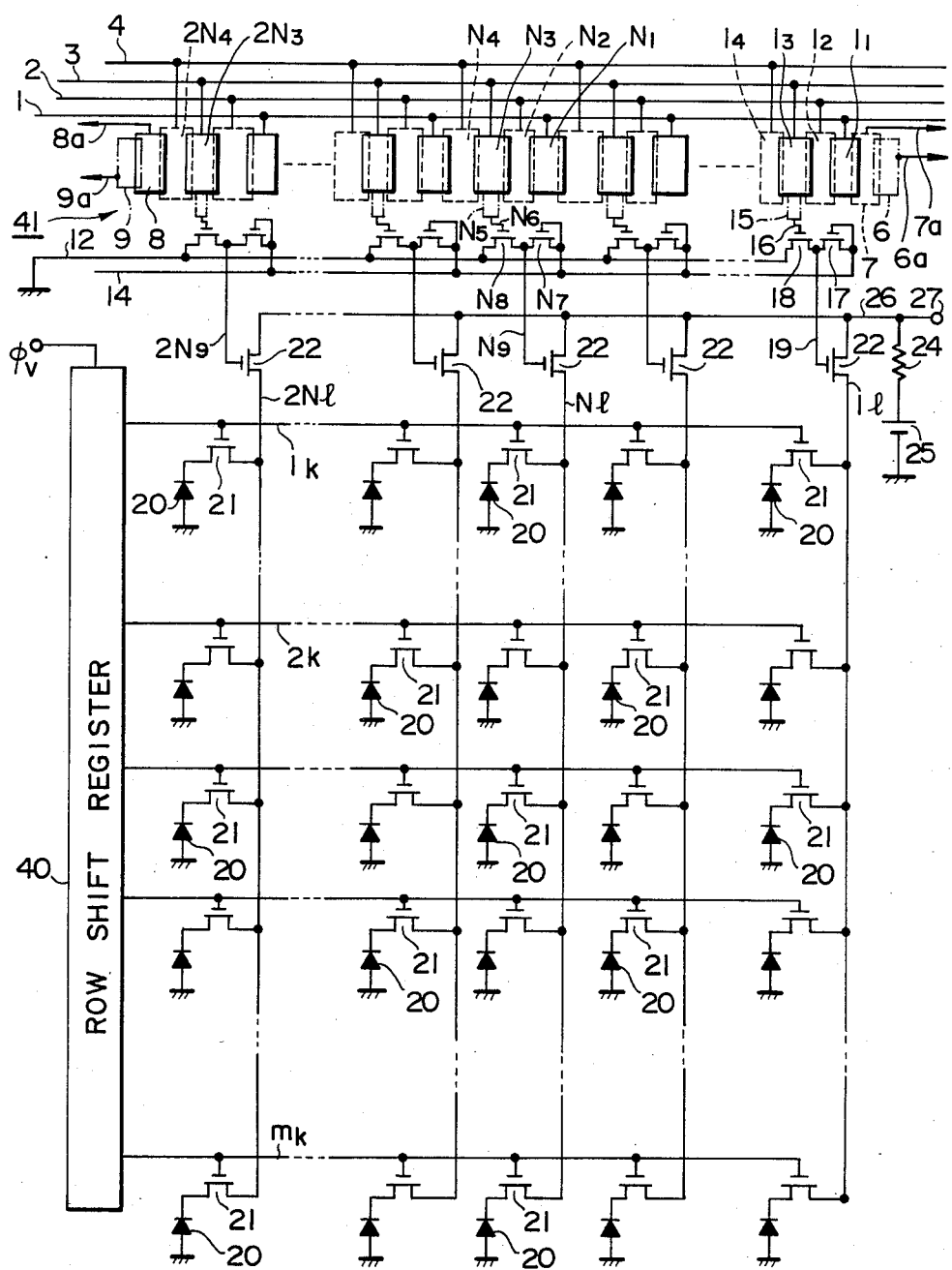

SOLID STATE IMAGING APPARATUS AND SOLID STATE PHOTOSENSOR ARRANGEMENT

BACKGROUND OF THE INVENTION

1. Field of the Invention

The present invention relates to a solid state imaging apparatus and a solid state photosensor arrangement and, more particularly, to those which are provided with a unique scanning section for scanning a solid state imaging device or a one-dimensional photosensitive array optical sensor.

2. Description of the Prior Art

The current trend in the art of video cameras and other imaging instrumentations is toward the use of a solid state imaging apparatus which is implemented by a solid state imaging device. A solid state imaging device which replaces the traditional image pick-up tube enhances a small-sized lightweight design of such an instrument. A predominant type of solid state imaging device known in the art is a MOS (metal oxide semiconductor) type imaging device which is easy to produce and capable of readily sensing an optical image of an object. However, the number of pixels and, therefore, resolution attainable with a MOS type imaging device is not great enough to keep up with the advent of high-grade television systems and large screens. That is, in such advanced systems, the increase in the number of pixels of the imaging device is the key to a successful display of delicate images.

As regards a solid state imaging arrangement of the type using a single imaging device, a greater number of pixels may be accomplished without resorting to any modification to the conditions of optics associated with the imaging device only if the area per pixel is reduced with the chip size unchanged. The problem with this approach is that the decrease in the area per pixel directly translates into a decrease in the light receiving area per pixel and, thereby, a decrease in the amount of light incident to each pixel. Video signals picked up from such pixels would show a prohibitively poor signal-to-noise (S/N) ratio, resulting in poor quality of images picked up by the device.

Another possible approach is increasing the chip size of an imaging device without changing the area per pixel so that the number of pixels may be increased in proportion to the increase in the total area. This approach, just as it solves the problem of the number of pixels, brings about another problem that an optical image of an object needs to be focused in greater dimensions on the imaging device complementarily to the increased chip size. That is, the optical image of an object has to be provided on the imaging device in larger magnifications relative to the object by installing a lens having a substantial focal length. Increasing the focal length of a lens without changing the f number, however, leads to an increase in the aperture of the lens which in turn results in a bulky and heavy construction of the optics and, therefore, that of the whole apparatus using such an imaging element and lens.

Another type of solid state imaging apparatus available today uses a pair of imaging devices and focuses two identical optical images of a single object to the two imaging devices through two branched optical paths. The total number of pixels attainable with the two-device type imaging apparatus is double the previously discussed single-device type imaging apparatus. In addition, the chip size can be increased to further increase the total number of pixels without substantially affecting the size and weight of the optics, because the resulting increase in the area per imaging device is only half the increase required of the imaging device of the single-device type apparatus.

Incontrovertibly, an imaging system of the kind using a pair of solid state imaging devices is apt to become rather bulky and heavy due to the use of extra optical elements such as a mirror and a prism in addition to a lens. Nevertheless, such a system is satisfactory so far as resolution is concerned and matches the current trend in the art.

The problem with the imaging system using a pair of solid state imaging elements is that the imaging apparatus focuses an image with the intermediary of a mirror. Specifically, an optical image transmitted through a dichroic mirror is focused to one imaging device in an orientation which is opposite in one direction to an optical image which is provided on the other imaging device after being reflected by the mirror. In this condition, images produced by the two imaging devices cannot be matched to each other unless they are scanned in opposite directions to each other with respect to the above-mentioned one specific direction.

Some expedients have heretofore been presented to allow a pair of imaging devices to be scanned or read in different directions for matching purpose. One of them is producing a group of imaging devices having pixels oriented in one direction and a group of imaging devices having pixels oriented in the other direction, and another is producing imaging devices each having shift registers located at both sides of a photosensitive area so that the imaging devices may be scanned in either direction. The first-mentioned expedient is undesirable because the two different kinds of imaging devices are necessarily paired in the production line keeping pace with one of the kinds which is poorer in yield than the other, at the sacrifice of economy. The second-mentioned expedient has the drawback that since one of each paired shift registers which is not faulty is used and since a fault is apt to concentrate to either one of the imaging devices in the pairs, the imaging apparatuses have to be produced, which again in pace with one of them which is poorer in yield than the other at the cost of economy.

SUMMARY OF THE INVENTION

It is therefore an object of the present invention to provide a solid state imaging apparatus and a solid state photosensor arrangement which can be produced at low cost with high quality.

In accordance with an aspect of the present invention, a solid state imaging apparatus comprises: a semiconductor substrate; an array of photosensitive cells formed on said substrate in the form of rows and columns to produce pixel signals; a plurality of row conductor means formed on said substrate to be connected to said photosensitive cells for selecting the rows of photosensitive cells; a plurality of column conductor means formed on said substrate to be connected to said photosensitive cells for conveying pixel signals produced from a photosensitive cell selected by said row conductor means; row selecting means for selecting said plurality of row conductor means in a row scanning direction; and column selecting means for selecting said plurality of column conductor means in a column scanning direction to cause a photosensitive cell to produce pixel signals; said row selecting means comprising: charge transfer means operative in response to drive pulses for transferring charges in the row scanning direction; signal transmitting means for transmitting potential signals associated with the charges transferred by said charge transfer means; and row selection gate means operative in response to the potential signals for selecting said plurality of row conductor means; whereby said row selection gate means sequentially selects said plurality of row conductor means in response to said charge transfer means transferring the charges.

In accordance with another aspect of the present invention, a solid state imaging apparatus comprises: a semiconductor substrate; an array of photosensitive cells formed on said substrate in the form of rows and columns to produce pixel signals; a plurality of row conductor means formed on said substrate to be connected to said photosensitive cells for selecting the rows of photosensitive cells; a plurality of column conductor means formed on said substrate to be connected to said photosensitive cells for conveying pixel signals produced from a photosensitive cell selected by said row conductor means; row selecting means for selecting said plurality of row conductor means in a row scanning direction; and column selecting means for selecting said plurality of column conductor means in a column scanning direction to cause a photosensitive cell to produce pixel signals; said column selecting means comprising: charge transfer means operative in response to drive pulses for transferring charges in the column scanning direction; signal transmitting means for transmitting potential signals associated with the charges transferred by said charge transfer means; and column selection gate means operative in response to the potential signals for selecting said plurality of column conductor means; whereby said column selection gate means sequentially selects said plurality of column conductor means in response to said charge transfer means transferring the charges to cause the pixel signals to be produced.

In accordance with further aspect of the present invention, a solid state photosensor arrangement comprises: a semiconductor substrate; a plurality of photosensitive cells formed on said substrate in line to produce pixel signals; and selecting means for selecting said plurality of photosensitive cells in a scanning direction to cause said plurality of photosensitive cells to sequentially produce the pixel signals; said selecting means comprising: charge transfer means operative in response to drive pulses for transferring charges in the scanning direction; signal transmitting means for transmitting signals associated with the potential charges transferred by said charge transfer means; and gate means operative in response to the potential signals for selecting said plurality of photosensitive cells to cause the pixel signals to be produced.

BRIEF DESCRIPTION OF THE DRAWINGS

The objects and features of the present invention will become more apparent from a consideration of the following detailed description taken in conjunction with the accompanying drawings in which:

FIGS. 3A–3U and FIGS. 4A–4S are timing charts useful for understanding the operation of the apparatus shown in FIG. 1;

FIG. 6 is a schematic circuit diagram of another embodiment of the present invention;

DESCRIPTION OF THE PREFERRED EMBODIMENTS

Figure 1:
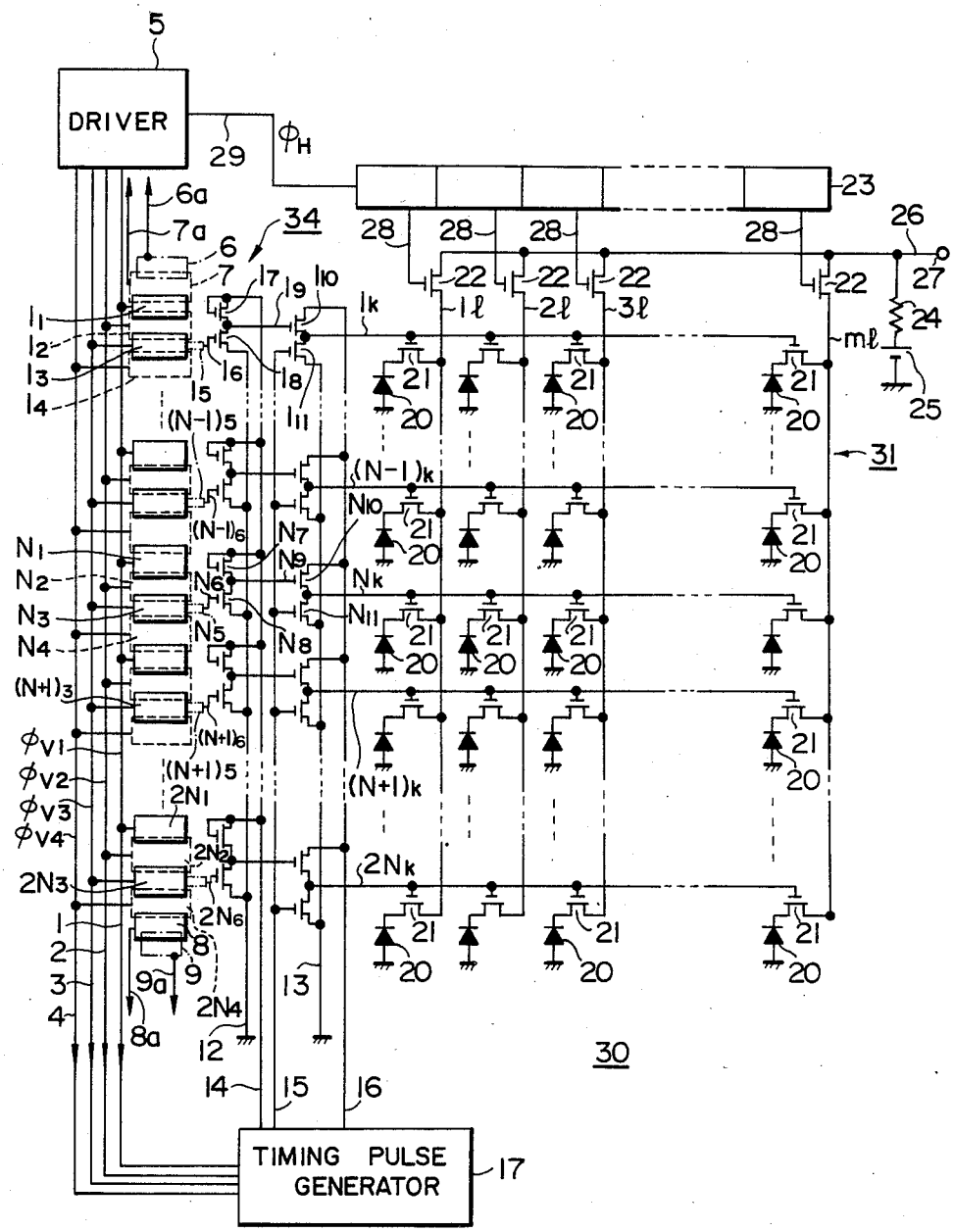
FIG. 1 is a schematic circuit diagram of a solid state imaging apparatus embodying the present invention.

Referring to FIG. 1 of the drawings, a solid state imaging apparatus embodying the present invention is shown and includes a two-dimensional solid-state imaging device as generally designated by the reference numeral 30. In this particular embodiment, the imaging device 30 has a MOS (metal oxide semiconductor) type configuration and comprises an array of photosensitive cells, or photodiodes, 20 which are arranged in a matrix or a semiconductor substrate. The photosensitive cell array is generally labeled 31 in the drawing. In this type of imaging device, a current charged to any of the photosensitive cells 20 which is selected by so-called XY (row and column) addressing is read out.

Each of the photosensitive cells 20 is connected to a predetermined one of column transfer lines, or electrode conductors, 11, 21, ..., ml via a source-to-drain path of a column transfer gate 21 associated therewith. The gate of each column transfer gate 21 is connected to a predetermined one of row transfer lines 1k, 2k, ..., 2Nk. In this construction, photoelectric charges stored in any of the photosensitive cells 20 responsive to incident radiation are transferred via an associated one of the column transfer gates 21 to an associated one of the column transfer lines 11, 21, ..., ml. The column transfer lines 11, 21, ..., ml are commonly connected to a video signal output line 26 via source-drain paths of column selection gates 22 assigned in one-to-one correspondence thereto, the video signal output line 26 leading to a video signal output terminal 27. The line 26 is connected to ground via a series connection of a current limiting resistor 24 and a dc power source 25.

The gates of the column selection gates 22 respectively are connected to consecutive stages of a shift register 23 by column addressing lines 28. In the illustrative embodiment, the shift register 23 generates column scanning signals for sequentially energizing the column addressing lines 28 responsive to a column scanning clock $\phi_H$, which is applied to the shift register 23 from a driver 5 over a control line 29. Pixel signals appearing on the column transfer lines 11, 21, ..., ml are time-serially routed to the video signal output terminal 27 via the associated column selection gates 22, which are selected one after another by the shift register 23 via the lines 28 and timed to the clock $\phi_H$.

A CCD (charge-coupled device) type CTD (charge transfer device) includes polycrystalline silicon electrodes which are arranged in groups by fours and such electrode groups are assigned in one-to-one correspondence to the row transfer lines 1k, 2k, ..., 2Nk. For example, electrodes $N_1$, $N_2$, $N_3$ and $N_4$ in the N-th group are associated with the row transfer line Nk and arranged side by side along the column transfer lines so as to transfer a charge in that order. As shown, an $n^+$-type diffusion layer $N_5$ extends out from beneath the third electrode $N_3$ in the N-th group in such a manner as to communicate with a potential well which will be developed below the electrode $N_3$ as will be described. Gates $N_7$ and $N_8$ which in combination serve as an inverter have their drain and source electrodes of a MOS transistor interconnected as illustrated, an output line $N_9$ leading from the junction of those drain and source electrodes. The gate electrode of the gate $N_7$ is connected to a line 14 together with the source electrode, while the gate electrode of the gate $N_8$ is connected to the diffusion layer $N_5$ by a line $N_6$. The line $N_9$ leads to the gate electrode of a gate $N_{10}$ which cooperates with another gate $N_{11}$ to provide a row selection gate, in order to on-off control the row selection gate. The source electrode of the gate $N_{10}$ and the drain electrode of the gate $N_{11}$ are interconnected, a line 16 leading from the junction of those source and drain electrodes. The drain electrode of the gate $N_{10}$ is connected to a line 16, and the gate electrode of the gate $N_{11}$ to a line 15. The source electrode of the gate $N_{11}$ is connected to ground.

Transfer electrodes $1_1 \sim 1_4, \ldots, 2N_1 \sim 2N_4$ of the first to 2N-th groups other than the N-th group and the row transfer lines $1k, 2k, \ldots, 2Nk$ except for the low transfer line Nk are each related in the same manner as the transfer electrodes of the N-th group and the row transfer line Nk. Therefore, let it suffice to replace the label N in the above description with the serial labels $1, 2, \ldots, 2N$ and add subscripts which are numerals and alphabet k. They are sequentially arranged in the direction of the column transfer lines so that a charge may be transferred from the electrodes of the first group toward the 2N-th group.

Lines 1-4 for four-phase drive extend out from the driver 5. The first transfer electrodes $1_1, 2_1, \ldots, (N-1)_1, N_1, (N+1)_1, \ldots, 2N_1$ of the first to 2N-th CTD electrode groups are commonly connected to the drive line 1 assigned to the first phase, and the second transfer lines $1_2, \ldots, 2N_2$ are commonly connected to the drive line 2 which is assigned to the second phase. Likewise, the third transfer electrodes $1_3, 2_3, \ldots, (N-1)_3, N_3, (N+1)_3, \ldots, 2N_3$ of the first to 2N-th CTD electrode groups are connected to the drive line 3 assigned to the third phase, and the fourth transfer electrodes $1_4, \ldots, 2N_4$ to the drive line 4 which is assigned to the fourth phase. An electrode 7 is provided next to the first electrode $1_1$ of the first group and an electrode 8 next to the fourth electrode $2N_4$ of the 2N-th group, each for defining a potential well to enable charge transfer. An $n^+$-type diffusion layer 6 extends out from beneath the electrode 7 to communicate with the potential well which is defined by the electrode 7. In the same manner, an $n^+$-type diffusion layer 9 extends out from beneath the electrode 8 which also develops a potential well. A line 7a leads from the electrode 7, a line 8a from the electrode 8, a line 6a from the diffusion layer 6, and a line 9a from the diffusion layer 9.

Timed to the driver 5, the timing pulse generator 17 produces a high level output on the line 14 when only the drive line 3 out of the four drive lines 1-4 is high level, an inverted version of a signal appearing on the drive line 3 on the line 15, and a signal identical with and synchronous to the signal appearing on the drive line 3 on the line 16.

Figure 2A:
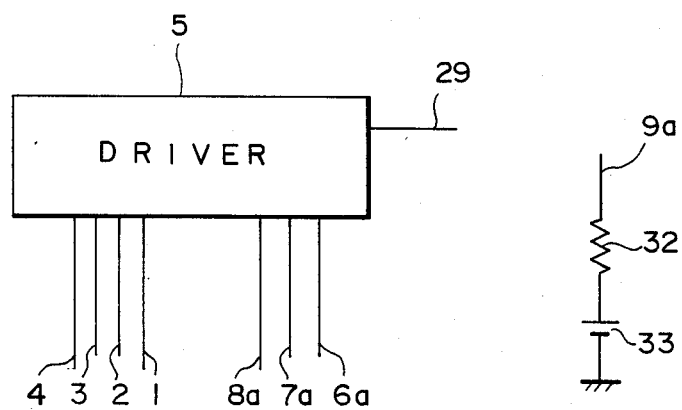
FIGS. 2A and 2B are schematic diagrams of exemplary connections for providing different scanning directions of the driver shown in FIG. 1.
Figure 2B:
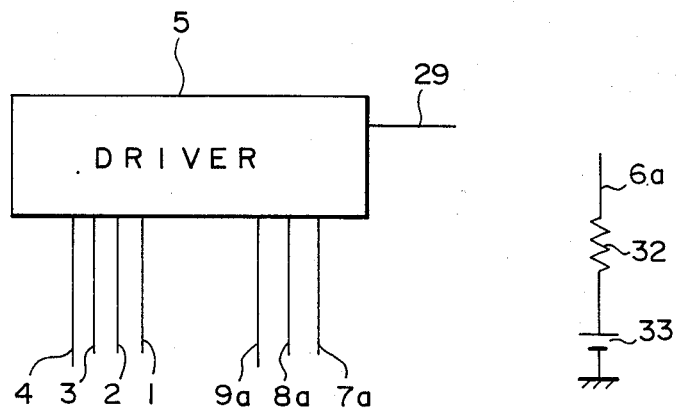

To transfer charges from the transfer electrode $1_1$ toward the transfer electrode $2N_4$, the lines 6a, 7a and 8a are connected to the driver 5 while the line 9a, as shown in FIG. 2A, is connected to ground via a series connection of a resistor 32 and a dc power source 33. Conversely, to transfer charges from the transfer electrode $2N_4$ toward the transfer electrode $1_1$, the lines 7a, 8a and 9a are connected to the driver 5 while the line 6a, as shown in FIG. 2B, is connected to ground via the series connection of the resistor 32 and dc power source 33. One of the $n^+$-type diffusion layers 6 and 9 which is connected to the driver 5 is used to inject charges, and the other to drain the charges.

In the construction shown in FIG. 1, the solid state imaging device which includes all the elements except for the driver 5, timing pulse generator 17, resistor 24 and power source 25 is provided on a single wafer by a sequence of steps using semiconductor technology. The wafer may be implemented by a $p^+$-type silicon substrate, for example.

The operation of the imaging device will be described, first assuming that the row transfer lines $1k, 2k, \ldots, Nk, \ldots, 2Nk$ are sequentially scanned in this order to deliver video signals to the output terminal 27. In this instance, let it be assumed that as previously stated the line 9a is connected to ground as shown in FIG. 2A, the lines 6a, 7a and 8a are connected to the driver 5, and the CTD transfers charges from the transfer electrode $1_1$ toward the transfer electrode $2N_4$. The operation is demonstrated in a timing chart in FIGS. 3A-3U.

First, assume that an optical image is focused by optics, not shown, onto the photosensitive cell array 31 of the solid state imaging device 30. The driver 5 applies a pulse to the electrode 7 over the line 7a so that a potential well develops beneath the electrode 7 over the duration of the input pulse. In the meantime, the driver 5 applies a negative potential to the line 6a so as to inject electrons into the potential well via the line 6a and $n^+$-type diffusion layer 6, FIGS. 3A and 3B. In the latter period of the duration of the pulse applied to the electrode 7, the driver 5 applies a drive pulse to the drive line 1. The pulses applied to the electrode 7 and line 6a fall in due course after the appearance of the drive pulse on the drive line 1, with the result that the electrons stored in the potential well beneath the electrode 7 are transferred to a potential well then provided beneath the transfer electrode $1_1$. Drive pulses are cyclically applied to the other drive lines 2, 3 and 4 as well in this order, FIGS. 3C-3F. By such a sequence of events, the electrons in the potential well beneath the transfer electrode $1_1$ are sequentially transferred to potential wells which are sequentially provided below the transfer electrodes $1_2, 1_3, 1_4, 2_1, \ldots, N_1, N_2, N_3, N_4, \ldots, 2N_1, 2N_2, 2N_3, 2N_4$, as is the case with ordinary CCDs.

Assume that the driver 5 has delivered a pulse over the line 3 to the third transfer electrode $N_3$ of the N-th group at a time $t_1$ by way of example. Then, a potential well develops beneath the electrode $N_3$ and to which electrons are transferred from the potential well beneath the electrode $N_2$. The drive pulse applied to the line 2 falls at a time $t_2$, while a drive pulse is applied from the driver 5 to the line 4 at a time $t_3$ which is later than the time $t_2$. Hence, during the interval between the times $t_1$ and $t_2$, a potential well does not develop beneath the electrode $N_2$ or $N_4$ and develops only beneath the electrode $N_3$ to store incoming electrons. In the meantime, the timing pulse generator 17 delivers pulses associated with the above-mentioned periods to the lines 14 and 15, and a pulse synchronous to the pulse applied to the line 3 to the line 16. At a time $t_4$, the pulse on the line 3 disappears so that all the electrons stored in the potential well beneath the electrode $N_3$ are transferred to a potential well beneath the electrode $N_4$. Hence, the period of time for which the electrons transferred to the potential well beneath the electrode $N_3$ actually stay therein is equal to the duration of the pulse which is applied to the line 3 between the times $t_1$ and $t_4$.

For the above period, a negative potential derived from the electrons is coupled to the gate $N_8$ via the diffusion layer $N_5$ and line $N_6$, deactivating the normally active drain and source of the gate $N_8$. As a result, the output line $N_9$ of the inverter which comprises the gate $N_8$ remains high level from the time $t_2$ to the time $t_3$, during which period the signal applied to the line 14 remains high level. Meanwhile, the row selection gate $N_{11}$ which receives at its gate an inverted version of the signal applied to the drive line 3 over the line 15 remains disabled over the interval between the times $t_1$ and $t_4$. Hence, while the output line $N_9$ is high level, the row selection gate $N_{10}$ remains enabled; the line 16 remains high level for the interval between the times $t_2$ and $t_3$ during which only the drive line 3 out of the drive lines 1–4 is high level.

In the above condition, only the row transfer line Nk is selected and made high level for the period between the times $t_2$ and $t_3$ so that only those row transfer gates 21 whose gate electrodes are interconnected to the line Nk are enabled. For that period, the driver 5 applies the column scanning clock $\phi_H$ to the shift register 23 over the control line 29 so as to sequentially enable the column selection gates 22, thereby selecting the column transfer lines 1l, 2l, ..., ml one after another. For example, while the column transfer line 1l is selected, the channel of one of the column transfer gates 21 which is interconnected to the column transfer line 1l and the row transfer line Nk is selected with the result that a closed loop is completed by the power source 25, resistor 24, video signal output line 26, associated column selection gate 22, column transfer line 1l, channel of the column transfer gate 21, and photosensitive cell 20, thereby delivering a single video signal to the output terminal 27. This is repeated to sequentially select the other column transfer lines 2l, 3l, ..., ml to complete a closed loop each time, thereby producing video signals time-serially at the output terminal 27.

In the same manner as the row transfer line Nk, each of the other row transfer lines which is associated with one of the third electrodes $1_3$, $2_3$, ..., $2N_3$ connected to the drive line 3 and storing electrons in its associated potential well is selected to become high level. In the meantime, video signals complementary to the amounts of radiation incident on the photosensitive cells 20 which are connected to the sources of the column transfer gates 21 associated with the selected row transfer line are routed time-serially to the output terminal 27 as the column transfer lines 1l, 2l, ..., ml are sequentially selected responsive to the clock $\phi_H$. The electrons transferred by the above procedure to a potential well which is provided beneath the transfer electrode $2N_4$ are further shifted therefrom to a potential well beneath the electrode 8 responsive to a pulse which is delivered from the driver 5 to the electrode 8 over the line 8a, FIG. 3U. The electrons in the potential well beneath the electrode 8 are drained to the dc power source 33 via the diffusion layer 9.

Next, assume a case wherein the row transfer lines are sequentially selected in the opposite direction, i.e., from the line 2Nk toward the line 1k, in order to produce video signals at the output terminal 27. In this case, the line 6a is connected as shown in FIG. 2B as previously mentioned, while the lines 7a, 8a and 9a are connected to the driver 5. Let it be assumed that the CTD transfers charges from the transfer electrode $2N_4$ toward the transfer electrode $1_1$. The following description will be made with reference made to the timing chart of FIGS. 4A–4S as well.

The driver 5 applies a pulse to the electrode 8 over the line 8a so that for the duration of that pulse a potential well is provided beneath the electrode 8, FIG. 4A. In the meantime, the driver 5 applies a negative potential to the line 9a, FIG. 4B, so as to inject electrons into the potential well beneath the electrode 8 via the line 9a and n+-type diffusion layer 9. In the latter period of the duration of the pulse applied to the electrode 8, the driver 5 applies a drive pulse to the drive line 4, FIG. 4C. The pulses delivered to the electrode 8 and line 9a soon fall after the appearance of the drive pulse on the drive line 4, with the result that the electrons stored in the potential well beneath the electrode 8 are transferred to a potential well then provided beneath the transfer electrode $2N_4$. Such pulses for four-phase drive are cyclically applied to the other drive lines 3, 2 and 1 as well in this order, FIGS. 4D–4F. The electrons in a potential well beneath the transfer electrode $2N_4$ are sequentially transferred as in ordinary CCDs through potential wells which are developed one after another beneath the transfer electrodes $2N_3$, $2N_2$, $2N_1$, ..., $N_4$, $N_3$, $N_2$, $N_1$, ..., $1_4$, $1_3$, $1_2$, $1_1$.

In the above condition, the driver 5 applies a pulse over the drive line 3 to any of the third transfer electrodes $2N_3$, ..., $N_3$, ..., $1_3$ in the previously described manner, thereby selecting one of the row transfer lines associated with a particular transfer electrode which has developed a potential well therebeneath. Assuming that the particular transfer electrode is $N_3$, the row transfer line associated therewith is Nk. Then, video signals complementary to the amounts of radiation incident on the photosensitive cells 20 which are connected to the sources of those column transfer gates 21 connected to the row transfer line Nk are sequentially routed to the output terminal 27. This is due to the previously described sequence of events. Specifically, while a certain row transfer line is selected, the column transfer lines 1l, 2l, ..., ml are sequentially scanned responsive to the column scanning clock $\phi_H$ so that the dc power source 25, resistor 24 and video output line 26 sequentially complete closed loops in cooperation with selected column selection gates 22, selected column transfer lines, column transfer gates 21 connected to the selected column transfer lines and selected row transfer line, and photosensitive cells 20 connected to the sources of those column transfer gates 21.

Figure 5A:
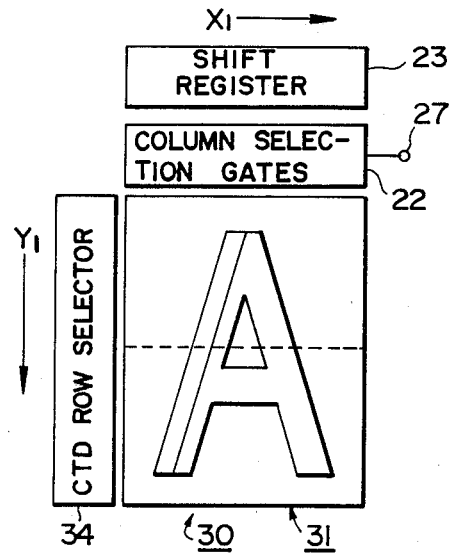
FIGS. 5A and 5B show by way of example directions in which the apparatus of FIG. 1 will be scanned when applied to a two-device type imaging system.
Figure 5B:
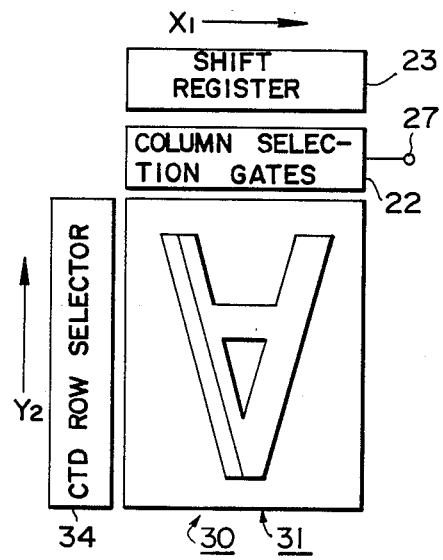

Referring to FIG. 5A, an optical image representative of an alphabet "A" is shown which is focused to the photosensitive cell array 31 of the solid state imaging device. The light image of FIG. 5A is shown in FIG. 5B in a position which is inverted 180 degrees in the direction of arrangement of the row transfer lines. Specifically, the optical image on the photosensitive cell array 31 shown in FIG. 5B is produced by rotating the optical image shown in FIG. 5A about a dotted line which represents the center of the array 31 with respect to the columns.

Concerning a solid state imaging device of the type shown in FIG. 5A, a CTD row selector circuit 34 which is also shown in FIG. 1 is operated to sequentially scan the row transfer lines in a direction indicated by an arrow $Y_1$ (from top to bottom) to select them one after another, while the shift register 23 is addressed to sequentially scan the column transfer lines via the associated column transfer gates 22 as indicated by an arrow $X_1$ (from left to right) for each of the selected row transfer lines. This is the scanning mode which has been discussed first with reference to FIG. 1. As to the other type of imaging device shown in FIG. 5B, the CTD row selector circuit 34 sequentially scans the row transfer lines as indicated by an arrow $Y_2$ (from bottom to top) to select them one after another, while the shift register 23 is sequentially addressed to sequentially scan the column transfer lines via the associated column transfer gates 22 as indicated by the arrow $X_1$ (from left to right) for each of the selected row transfer lines. This is the second scanning mode which has been discussed with reference to FIG. 1. It will be seen that video signals produced from the imaging devices shown in FIGS. 5A and 5B in the manner described are well matched to each other.

The selection of a row transfer line effected by the CTD row selector 34 in the case of FIG. 5B occurs one drive pulse earlier than the selection effected by the same in the case of FIG. 5A, resulting in correspondingly earlier appearance of a video signal. Where it is desired to match the video signals on a real time basis without resorting to a store or like means, the CTD row selector 34 may be constructed to delay the generation of a drive pulse for compensating for the time lag or the output terminal 27 may be provided with a delay circuit for the same purpose.

Although not shown in FIG. 5A or 5B, the photosensitive cell array 31 is covered with a suitably colored stripe filter or a mosaic color filter as usual. Such a filter is well known in the art and, therefore, detailed description thereof will be omitted for simplicity.

Referring to FIG. 6, another embodiment of the present invention is shown which uses a CTD driver for the purpose of sequentially scanning column transfer lines and not row transfer lines. As shown, the CTD drive electrodes $1_1, 1_2, 1_3, 1_4, 2_1, \ldots, 2N_3, 2N_4$ are interconnected to the four-phase drive lines 1, 2, 3 and 4 as in the first embodiment. The N+-type diffusion layers $1_5, 2_5, \ldots, N_5, \ldots, 2N_5$ extend out respectively from the third electrodes $1_3, 2_3, \ldots, N_3, \ldots, 2N_3$ to communicate with potential wells which will be developed by the latter.

The gates $1_7$ and $1_8, \ldots, N_7$ and $N_8, \ldots, 2N_7$ and $2N_8$ constitute inverters in combination. Among those gates, the gates $1_8, \ldots, N_8, \ldots 2N_8$ whose source electrodes are connected to ground are connected to the diffusion layers $1_5, \ldots, N_5, \ldots, 2N_5$, respectively. The outputs of the inverters are applied to the gate electrodes of the column selection gates 22, respectively. The source electrodes of the gates $1_8, \ldots, N_8, \ldots, 2N_8$ are connected to ground by the line 12, while gate and drain electrodes of the respective gates $1_7, \ldots, N_7, \ldots, 2N_7$ are interconnected to each other and to the line 14.

In practice, the drive lines 1–4 are connected to a driver and the line 14 to a timing pulse generator, as has been the case with the embodiment of FIG. 1. Provided next to the transfer electrode $1_1$ are the electrode 7 and the n+-type diffusion layer 6 which communicates with a potential well, which will be developed beneath the electrode 7. Further, provided next to the transfer electrode $2N_4$ are the electrode 8 and the n+-type diffusion layer 9 which communicates to a potential well, which will be developed beneath the electrode 8. Lines 7a, 8a, 6a and 9a lead out from the electrodes 7 and 8 and the diffusion layers 6 and 9, respectively. The drain electrodes of the column selection gates 22 are commonly connected to the video signal output line 26, while the source electrodes of the gates 22 are connected to the column transfer lines $1l, \ldots, Nl, \ldots, 2Nl$, respectively.

A shift register 40 is connected at its output side to the consecutive row transfer lines $1k, \ldots, mk$. Responsive to a row scanning clock $\phi_V$, the shift register 40 sequentially selects the row transfer lines $1k, \ldots, mk$ in this order so as to apply a pulse to each of them.

The row transfer lines $1k, \ldots, mk$, column transfer lines $1l, \ldots, 2Nl$, photosensitive cells 20 and column transfer gates 21 are related with each other as previously discussed in relation to the first embodiment. It will be noted that the transfer electrodes $1_3, 2_3, \ldots, N_3, \ldots, 2N_3$ are associated in this order with the column transfer lines $1l, 2l, \ldots, Nl, \ldots, 2Nl$, respectively. The rest of the construction except for the interconnection of the lines 6a, 7a, 8a and 9a with other structural elements is the same as in FIG. 1 and, therefore, description thereof will be omitted. In the construction shown in FIG. 6, the various structural elements other than the power source are assumed to be provided on a single wafer by semiconductor production processes.

The operation of the imaging device shown in FIG. 6 will be described on the assumption that a charge is transferred from the electrode $1_1$ toward the electrode $2N_4$, and that the column transfer lines are sequentially scanned from $1l$ toward $2Nl$. In this case, only the line 9a is connected to the dc power source 33 as previously mentioned with reference to FIG. 2A.

As the photosensitive cell array 31 senses an image, the row shift register 40 sequentially selects the row transfer lines $1k, \ldots, mk$ in this order responsive to the row scanning clock $\phi_V$. Since each row transfer line becomes high level when selected, the column transfer gates 21 whose gate electrodes are interconnected to that row transfer line are enabled. While any of the row transfer lines $1k, \ldots, mk$ is selected, the column transfer lines $1l, \ldots, Nl, \ldots, 2Nl$ are sequentially scanned due to charge transfer in the CTD so that video signals from the one row transfer line are delivered to the output terminal 27. The charge transfer in the CTD proceeds as follows.

A pulse is applied to the electrode 7 over the line 7a to develop a potential well beneath the electrode 7. Then, electrons are charged into the potential well via the line 6a and n+-type diffusion layer 6. In the latter period of the duration of that pulse, a drive pulse is applied to the drive line 1. At the instant when the pulses applied to the electrode 7 and line 6a have disappeared, the electrons in the potential well provided beneath the electrode 7 are transferred to a potential well which will have been formed beneath the transfer electrode $1_1$ at that time. Drive pulses are cyclically applied to all the drive lines 1–4 in this order with the result that the electrons in the potential well provided beneath the transfer electrode $1_1$ are transferred as in ordinary CCDs through potential wells which will sequentially develop beneath the transfer electrodes $1_2, 1_3, 1_4, 2_1, \ldots, N_1, N_2, N_3, N_4, \ldots, 2N_1, 2N_2, 2N_3, 2N_4$.

Assume that a drive pulse has been applied over the drive line 3 to the third transfer electrode $N_3$ of the N-th group. Then, a potential electrode develops below the transfer electrode $N_3$ so that the electrons in the potential well beneath the preceding electrode $N_2$ are transferred to that potential well. Thereafter, a pulse is applied to the next transfer electrode $N_4$ over the drive line 4 to develop a potential well below the electrode $N_4$. While the electrons are transferred from the potential well associated with the electrode $N_3$ to the potential well associated with the electrode $N_4$, a negative potential is coupled to the line $N_6$ via the diffusion layer $N_5$ to disenable the gate $N_8$ which is normally enabled. This enables the gate $N_9$, which cooperates with the gate $N_8$ as an inverter, for the duration of a pulse appearing on the line 14, thereby turning the output of the inverter made up of the gates $N_7$ and $N_8$ high level. This inverter output is applied over the line $N_9$ to the gate of the associated column selection gate 22 to enable it and, thereby, selects the column transfer line Nl. As a result, a closed loop is completed by the power source 25, resistor 24, video signal output line 26, enabled row selection gate 22, column transfer gate 21 connected to the selected row transfer line such as the line 1k and the column transfer line Nl, and photosensitive cell 20 which is connected to that column transfer gate 21. A current complementary to the amount of light incident on the particular photosensitive cell 20 flows through the closed loop, producing one video signal at the output terminal 27. In the same manner, the other column transfer lines 1l, 2l, ..., 2Nl are sequentially selected to complete individual closed loops so that video signals are time-serially applied to the output terminal 27.

As in the first embodiment, the electrons reached the potential well beneath the transfer electrode $2N_4$ after the sequential transfer are drained toward the dc power source 33 by way of a potential well beneath the electrode 8, diffusion layer 9, and line 9a.

Concerning the line 14, it remains high level only for the duration of a pulse which is applied to the drive line 3. During this period of time, the above-discussed process is performed to select the column transfer lines 1l, ..., Nl, ..., 2nl one after another to deliver the resulting video signals to the output terminal 27. Every time the row shift register 40 selects one of the consecutive row transfer lines 1k, ..., mk, the above procedure for providing video signals is cyclically repeated.

Meanwhile, in the case where charges are transferred from the transfer electrode $2N_4$ toward the transfer electrode $1_1$ and the column transfer lines are sequentially scanned from 2Nl toward 1l, only the line 6a is connected to the dc power source 33 as has been mentioned in relation to FIG. 2B. After an optical image has become incident to the photosensitive cell array 31, the row shift register 40 sequentially scans the row transfer lines 1k, ..., mk in this order responsive to the row scanning clock $\phi_V$. While any of the row transfer lines 1k, ..., mk is scanned, the column transfer lines 1l, ..., Nl, ..., 2Nl are sequentially selected due to charge transfer in the CTD to produce video signals associated with one transfer line at a time as will be described in detail.

Electrons are charged into a potential well which is provided beneath the electrode 8 via the $n^+$-type diffusion layer 9 and, then, sequentially transferred responsive to pulses which are applied to the drive lines 4, 3, 2 and 1 in this order. When electrons have reached a potential well beneath, for example, the transfer electrode $N_3$, the column transfer line Nl is selected by the previously described procedure. This, as will be recalled, completes a closed loop to deliver one video signal to the output terminal 27. As the electrons are sequentially transferred through potential wells which develop beneath the transfer electrodes $2N_3, ..., N_3, ..., 1_3$, the column transfer lines 2Nl, ..., Nl, ..., 1l are selected in this order to individually set up a closed loop to apply video signals to the output terminal 27.

The above-discussed cycle, or process, occurs every time the row shift register 40 selects one of the row transfer lines 1k, ..., mk, delivering video signals to the output terminal 27. Each time the electrons reach the potential well beneath the transfer electrode $1_1$, they are discharged to the dc power source 33 via the potential well associated with the electrode 7, diffusion layer 6, and line 6a.

Figure 7A:
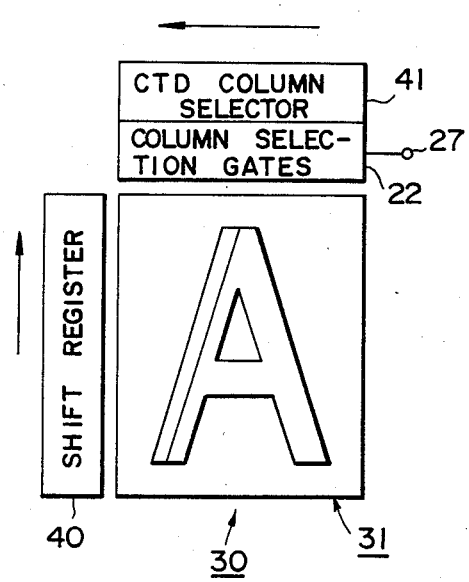
FIGS. 7A and 7B show by way of example directions in which the apparatus of FIG. 6 will be scanned when applied to a two-device type imaging system.
Figure 7B:
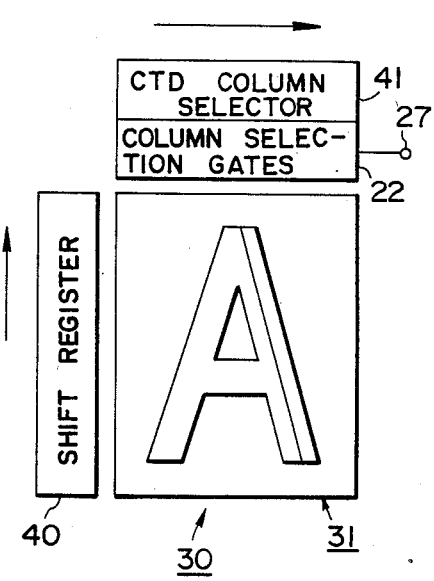

As shown in FIGS. 7A and 7B, the imaging device of FIG. 6 is applicable to a two-plate type solid state imaging apparatus, which includes a pair of solid state imaging devices mating with each other to pick up the same images in mirror image relation. Optical images provided on the photosensitive cell arrays 31 which are shown in FIGS. 7A and 7B are inverse to each other in the lateral direction. The row shift registers 40 in FIGS. 7A and 7B scan their associated photosensitive cell arrays 31 in the same direction as indicated by arrows, while CTD column selectors 41 which are also shown in FIG. 6 scan their associated columns in laterally opposite directions to each other. Such opposite column scanning directions will allow video signals to be produced from the imaging devices of FIGS. 7A and 7B while being matched to each other.

It should be noted that the CCD type CTD which has been used in the embodiments shown and described as charge transfer means may be replaced with any other suitable type of CTD such as a BBD (bucket-brigade device) type CTD insofar as they fulfill the role of charge transfer. Also, the timing pulse generator may be of the kind which generates pulses by gating those pulses which are adapted for four-phase drive.

Figure 8:
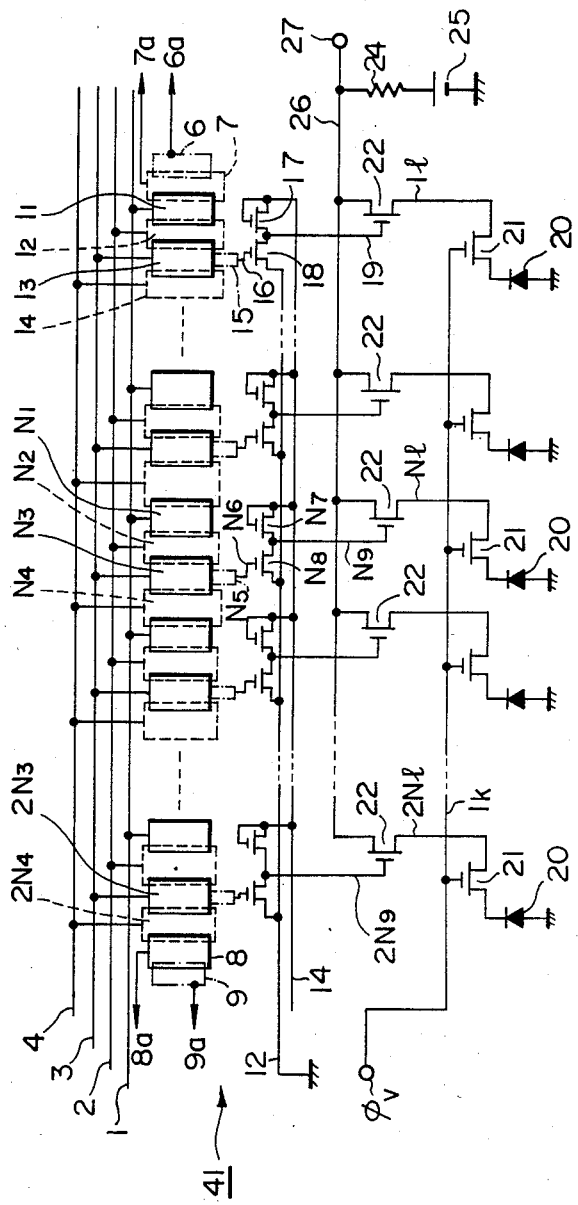
FIG. 8 is a schematic circuit diagram showing another embodiment of the present invention.

Further, the present invention is applicable not only to the photosensitive cell array arranged in a matrix as shown and described but also to a single array of photosensor elements. For example, with reference to FIG. 8, a single array of photosensor elements may be interconnected to a single row transfer line such as 1k shown in FIG. 6 and sequentially scanned by a CTD to sense one line of images at a time. In the figure, like constituent elements are designated by the same reference numerals as of the other illustrative embodiments. Where the single photosensor array is applied to a two-plate type solid state imaging apparatus, for example, it may be mechanically moved in a direction perpendicular to the scanning direction.

In summary, it will be seen that the present invention provides a solid state imaging apparatus which is capable of sequentially scanning row transfer lines or column transfer lines in a desired one of opposite directions by means of a single selector circuit, which is implemented by a CTD. Hence, concerning the application of such an imaging apparatus to an imaging system of the type using a pair of solid state imaging devices, all the individual devices which stood tests after production can be used in pairs to enhance cost-effective production. Because the imaging apparatus of the present invention is desirably applicable to a two-plate type imaging system, the number of pixels per imaging device can be readily increased to enhance resolution without resorting to any substantial enhancement of optics performance. Such a device offers a high resolution, lightweight and small-size image pickup system. In addition, the imaging apparatus of the present invention is simple in construction and, therefore, easy to produce.

Various modifications will become possible for those skilled in the art after receiving the teachings of the present disclosure without departing from the scope thereof.

What is claimed is:

1. A solid state imaging apparatus comprising:
   a semiconductor substrate;
   an array of photosensitive cells formed on said substrate in the form of rows and columns to produce pixel signals;
   a plurality of row conductor means formed on said substrate to be connected to said photosensitive cells for selecting the rows of photosensitive cells;
   a plurality of column conductor means formed on said substrate to be connected to said photosensitive cells for conveying pixel signals produced from a photosensitive cell selected by said row conductor means;
   row selecting means for selecting said plurality of row conductor means in a row scanning direction; and
   column selecting means for selecting said plurality of column conductor means in a column scanning direction to cause a photosensitive cell to produce pixel signals;
   said row selecting means comprising,
   a charge coupled device formed on said substrate to be driven in response to drive pulses in four phases for transferring charges in the row scanning direction;
   signal transmitting means for transmitting potential signals associated with the charges transferred by said charge coupled device; and
   row selection gate means operative in response to the potential signals for selecting said plurality of row conductor means;
   said signal transmitting means comprising MOS transistors which have a gate electrode connected to a charge transfer electrode of said charge-coupled device to produce the potential signals;
   said row selection gate means comprising MOS transistors which have a source-drain path connected to one of said row conductor means to select said one row conductor means in response to the potential signals;
   whereby said row selection gate means sequentially selects said plurality of row conductor means in response to said charge coupled device transferring the charges.

2. Apparatus in accordance with claim 1, wherein said column selecting means comprises:
   MOS transistors having a source-drain path connected between one of said plurality of column conductor means and a single output port common to said MOS transistors; and
   shift register means having register stages connected to respective gate electrodes of said MOS transistors for selecting said plurality of column conductor means in a column scanning direction to cause the respective source-drain paths to conduct the pixel signals therethrough.

3. Apparatus in accordance with claim 1, wherein each of said array of photosensitive cells comprises:
   a photosensitive diode for producing the pixel signals in response to light incident thereto; and
   a MOS transistor having a gate electrode connected to one of said row conductor means in common to a row of photosensitive cells, and a source-drain path connected between said diode and one of said plurality of column conductor means.

4. The solid state imaging apparatus of claim 1 wherein said charge coupled device is adaptable to transfer charge in a first direction or a second direction, opposite to said first direction in accordance with a connnection of said charge-coupled device to a driver and a power source, wherein said row selecting means scans the rows in a first scanning direction when said charge is transferred in said first direction and said row selecting means scans the rows in a second scanning direction when charge is transferred in a second direction.

5. A solid state imaging apparatus comprising:
   a semiconductor substrate;
   an array of photosensitive cells formed on said substrate in the form of rows and columns to produce pixel signals;
   a plurality of row conductor means formed on said substrate to be connected to said photosensitive cells for selecting the rows of photosensitive cells;
   a plurality of column conductor means formed on said substrate to be connected to said photosensitive cells for conveying pixel signals produced from a photosensitive cell selected by said row conductor means;
   row selecting means for selecting said plurality of row conductor means in a row scanning direction; and
   column selecting means for selecting said plurality of column conductor means in a column scanning direction to cause a photosensitive cell to produce pixel signals;
   said column selecting means comprising:
   a charge coupled device formed on said substrate to be driven in response to drive pulses of four phases for transferring charges in the column scanning direction;
   signal transmitting means for transmitting potential signals associated with the charges transferred by said charge coupled device; and
   column selection gate means operative in response to the potential signals for selecting said plurality of column conductor means;
   said column selection gate means comprising first MOS transistors having a source-drain path connected between one of said plurality of column conductor means and a single output port common to said first MOS transistors;
   said signal transmitting means comprising second MOS transistors which have a gate electrode connected to a charge transfer electrode of said charge-coupled device to produce the potential signals;
   said first MOS transistors having a gate electrode operative in response to the potential signals to conduct the source-drain path thereof to select one of said column conductor means, thereby causing the respective source-drain paths to conduct the pixel signals therethrough;
   whereby said column selection gate means sequentially selects said plurality of column conductor means in response to said charge-coupled device transferring the charges to cause the pixel signals to be produced.

6. Apparatus in accordance with claim 5, wherein said row selecting means comprises shift register means having register stages connected to said plurality of row conductor means for selecting said plurality of row conductor means in a row scanning direction.

7. Apparatus in accordance with claim 5, wherein each of said array of photosensitive cells comprises:
a photosensitive diode for producing the pixel signals in response to light incident thereto; and
a MOS transistor having a gate electrode connected to one of said row conductor means in common to a row of photosensitive cells, and a source-drain path connected between said diode and one of said plurality of column conductor means.

8. The solid state imaging apparatus of claim 5 wherein said charge coupled device is adaptable to transfer charge in a first direction or a second direction, opposite to said first direction in accordance with a connection of said charge-coupled device to a driver and a power source, wherein said column selecting means scans the columns in a first scanning direction when said charge is transferred in said first direction and said column selecting means scans the columns in a second scanning direction when charge is transferred in a second direction.

9. A solid state photosensor arrangement comprising:
a semiconductor substrate;
a plurality of photosensitive cells formed on said substrate in line to produce pixel signals; and
selecting means for selecting said plurality of photosensitive cells in a scanning direction to cause said plurality of photosensitve cells to sequentially produce the pixel signals;
said selecting means comprising:
a charge-coupled device formed on said substrate to be driven in response to drive pulses of four phases for transferring charges in the scanning direction;
signal transmitting means for transmitting signals associated witn the potential charges transferred by said charge-coupled device; and
gate means operative in response to the potential signals for selecting said plurality of photosensitive cells to cause the pixel signals to be produced;
said gate means comprising first MOS transistors having a source-drain path connected between one of the plurality of photosensitive cells and a signal output port common to said first MOS transistors;
said signal transmitting means comprising second MOS transistors which have a gate electrode connected to a charge transfer electrode of said charge coupled device to produce the potential signals;
said first MOS transistors having a gate electrode operative in response to the potential signals to conduct the source-drain path thereof to select one of said photosensitive cells, thereby causing the respective source-drain paths to conduct the pixel signals therethrough.

10. Arrangement in accordance with claim 9, wherein each of said photosensitve cells comprises:
a photosensitive diode for producing the pixel signals in response to light incident thereto; and
a MOS transistor having a gate electrode connected in common to said plurality of photosensitive cells to receive an enabling signal, and a source-drain path connected between said diode and said selecting means.

11. The solid state photosensor arrangement of claim 9 wherein said charge-coupled device adaptable to transfer charge in a first direction or a second direction, opposite to said first direction, in accordance with a connection of said charge coupled device to a driver and a power source, wherein said selecting means selects said plurality of photosensitive cells in a first scanning direction when charge is transferred in said first direction and said selecting means selects said plurality of photosensitive in a second scanning direction when charge is transferred in said direction.

* * * * *